(12) United States Patent
Camporeale et al.

(10) Patent No.: US 7,083,334 B2
(45) Date of Patent: Aug. 1, 2006

(54) HERMETICALLY SEALED OPTICAL FIBER FERRULE ASSEMBLY SUPPORTING MULTIPLE OPTICAL FIBERS

(75) Inventors: Savino S. Camporeale, Cranbury, NJ (US); David S. DeVincentis, Flanders, NJ (US)

(73) Assignee: Red Sky Subsea Ltd., Essex (GB)

( * ) Notice: Subject to any disclaimer, the term of this patent is extended or adjusted under 35 U.S.C. 154(b) by 0 days.

(21) Appl. No.: 10/699,605

(22) Filed: Oct. 31, 2003

(65) Prior Publication Data

US 2005/0094946 A1  May 5, 2005

(51) Int. Cl.
  *G02B 6/36* (2006.01)
(52) U.S. Cl. ...................................... 385/80
(58) Field of Classification Search ............... 385/76, 385/80, 89, 92, 94; 439/874, 936; 174/151
  See application file for complete search history.

(56) References Cited

U.S. PATENT DOCUMENTS 6,474,879 B1 * 11/2002 Warnes et al. ............... 385/80

2002/0186934 A1 * 12/2002 Hug et al. ..................... 385/80

FOREIGN PATENT DOCUMENTS

EP        0100086 A2 *  2/1984  .................. 372/44
JP       56165104 A  * 12/1981

* cited by examiner

*Primary Examiner*—Khiem Nguyen
(74) *Attorney, Agent, or Firm*—Mayer & Williams PC; Stuart H. Mayer, Esq.

(57) ABSTRACT

An hermetically sealed, optical fiber assembly is provided. The assembly includes a plurality of optical fibers and a ferrule. The ferrule has a first aperture extending through a first end of the ferrule and a plurality of second apertures extending through a second end of ferrule opposing the first end of the ferrule such that a continuous passage is formed between the first aperture and each of the second apertures. The first aperture, which has a diameter greater than a diameter of the second apertures, is sufficiently large in size to receive the plurality of optical fibers therein. Each of the optical fibers traverses the first aperture and a respective one of the second apertures. An adhesive material secures each of the optical fibers to the first aperture and to the respective one of the second apertures. A solder material bonds each of the optical fibers to an entrance to the respective one of the second apertures.

5 Claims, 2 Drawing Sheets

HERMETICALLY SEALED OPTICAL FIBER FERRULE ASSEMBLY SUPPORTING MULTIPLE OPTICAL FIBERS

FIELD OF THE INVENTION

The invention relates generally to optical fibers, and more particularly to a hermetically sealed optical fiber ferrule assembly.

BACKGROUND OF THE INVENTION

Components found inside optical devices such as optical transmitters, detectors, optical amplifiers and repeaters may be susceptible to environmental contaminates and/or residual assembly organics such as resins or fluxes which can result in galvanic corrosion and other failure modes which cause the optical device to no longer operate in an acceptable manner. Thus, the interior region of the optical device may be either evacuated or filled with an inert element such as nitrogen. Typically, the device housings are then hermetically sealed. However, a problem exists as to how the optical signal will penetrate the housing while maintaining hermeticity and without unacceptable degradation in the transmission properties of the optical signal.

An example of an optical device in which this problem is particularly severe is an undersea optical repeater. Optical repeaters are used to provide amplification and/or other signal processing to optical signals traveling in an undersea optical transmission cable. In a typical optical repeater, the optical fiber or fibers carrying the optical signals, which are located within the transmission cable, enter the repeater and are coupled through at least one amplifier and various components, such as optical couplers and decouplers, before exiting the repeater. Since the repeaters are subject to harsh undersea environmental conditions, they are housed in a sealed structure that protects the repeaters from environmental damage. Accordingly, it is particularly important that the optical fibers enter the repeater in a hermetically sealed manner.

Typically, the coupling ends of optical fibers are provided within a ferrule, which is then hermetically fixed by soldering, welding or epoxy into a passage into the optical device. The ferrule, which is used because the optical fibers are flexible and have a very small diameter, holds the optical fiber at the desired location to provide proper alignment between the optical device and an end of the optical fiber. The ferrule is positioned within an orifice of the optical device and mounted thereto so that an end of the fiber is positioned proximate to and aligned with the optical device.

While currently available ferrules generally accept only a single optical fiber, there is growing need for multifiber ferrules that can form a hermetic seal with each of the individual optical fibers that are contained in the ferrule. For example, in optical transmission systems such as an undersea transmission system the transmission cable typically contains two or more optical fibers since a fiber pair is required to provide bidirectional communication. Each of these optical fibers therefore must enter the undersea optical repeater in a hermetic manner.

Accordingly, it would be desirable to provide a ferrule that forms a hermetic seal with two or more optical fibers.

SUMMARY OF THE INVENTION

In accordance with the present invention, a hermetically sealed, optical fiber assembly is provided. The assembly includes a plurality of optical fibers and a ferrule. The ferrule has a first aperture extending through a first end of the ferrule and a plurality of second apertures extending through a second end of ferrule opposing the first end of the ferrule such that a continuous passage is formed between the first aperture and each of the second apertures. The first aperture, which has a diameter greater than a diameter of the second apertures, is sufficiently large in size to receive the plurality of optical fibers therein. Each of the optical fibers traverses the first aperture and a respective one of the second apertures. An adhesive material secures each of the optical fibers to the first aperture and to the respective one of the second apertures. A solder material bonds each of the optical fibers to an entrance to the respective one of the second apertures.

In accordance with one aspect of the present invention, the adhesive material substantially fills the first aperture.

In accordance with another aspect of the invention, a method is provided for forming a hermetically sealed, optical fiber assembly. The method begins by providing a ferrule having a first aperture extending through a first end of the ferrule and a plurality of second apertures extending through a second end of ferrule opposing the first end of the ferrule such that a continuous passage is formed between the first aperture and each of the second apertures. The first aperture has a diameter greater than a diameter of the second aperture. A plurality of optical fibers are inserted into the ferrule such that the plurality of optical fibers traverses the first aperture and each of the optical fibers traverse a respective one of the second apertures; An adhesive material is applied between each of the optical fibers and the first aperture and between each of the optical fibers and the respective one of the second apertures. A solder material is applied to bond each of the optical fibers to an entrance to the respective one of the second apertures.

In accordance with another aspect of the invention, the first aperture is substantially filled with the adhesive material.

DETAILED DESCRIPTION

Figure 1:
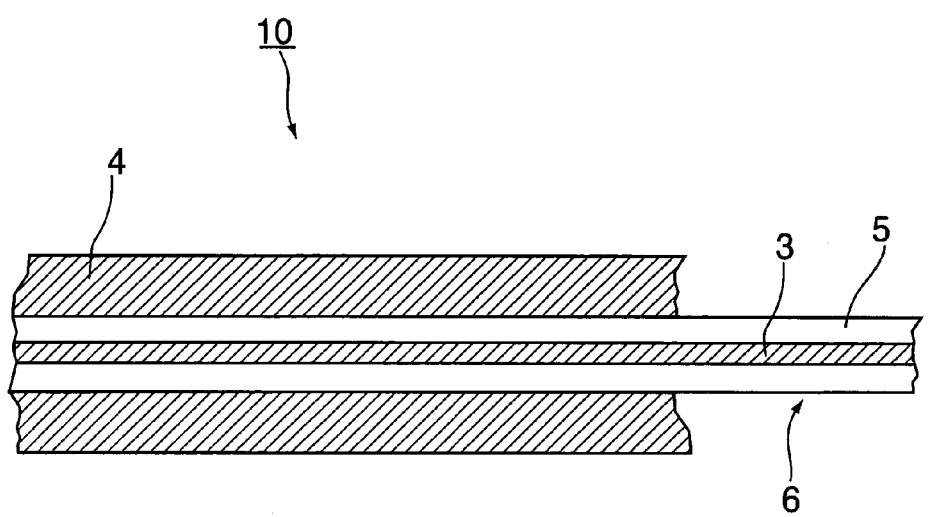
FIG. 1 is a length-wise, cross-sectional view of an optical fiber.

FIG. 1 is a length-wise, cross-sectional view of an optical fiber 10. The optical fiber 10 includes a core 3 and cladding layer 5 covered with a sheath 4. The optical fiber 6 may be a single mode or multi-mode optical fiber. As is known in the art, the cladding layer 5 has an index of refraction that is less than the index of refraction of the core 3 so that light entering the core at a certain angle of incidence or below is trapped therein by the cladding layer. The sheath 4 is made of a polymer material and the core and cladding layers are typically made of a glass such as silica.

Figure 2:
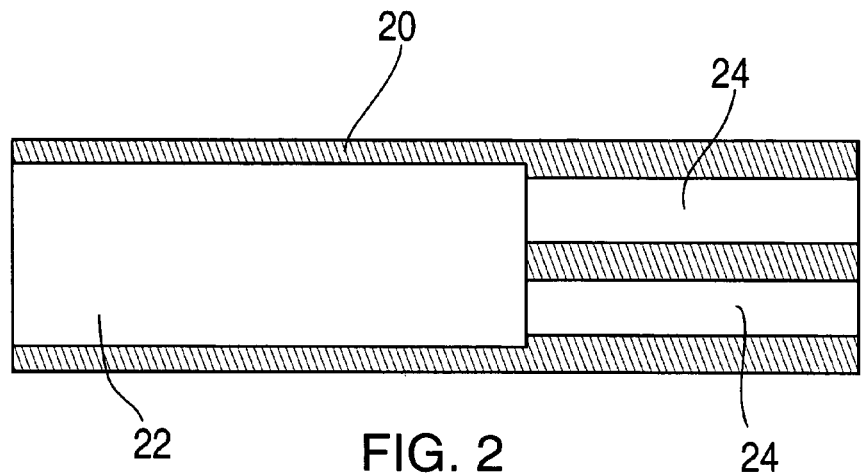
FIG. 2 is a cross-sectional, side view of a ferrule constructed in accordance with the present invention.

FIG. 2 is a cross-sectional, side view of a ferrule 20 constructed in accordance with the present invention. The ferrule 20 has one end bored out so as to form a large aperture 22 and the second end is bored out so as to form a plurality of small apertures 24 As best seen in the end view of the ferrule shown in FIG. 3, in this particular embodiment of the invention four small apertures 24 are provided. The large aperture 10 and the small apertures 24 are substantially coaxial with each other and are in communication with each other to define continuous cavities. The ferrule 20 is axisymmetric about the coaxial longitudinal axis of the large aperture, thus forming a generally cylindrical shape.

The ferrule 20 may be made of a ceramic or metal material. In some embodiments of the invention the ferrule is formed from copper or a copper alloy. Copper is desirable because it has a relatively low thermal conductivity, a coefficient of thermal expansion comparable to the silica core and cladding, and a density and hardness similar to some desirable solder materials. In addition, copper is easy to machine and therefore improves the manufacturablity and reduces the cost required to form the hermetic seal.

Figure 3:
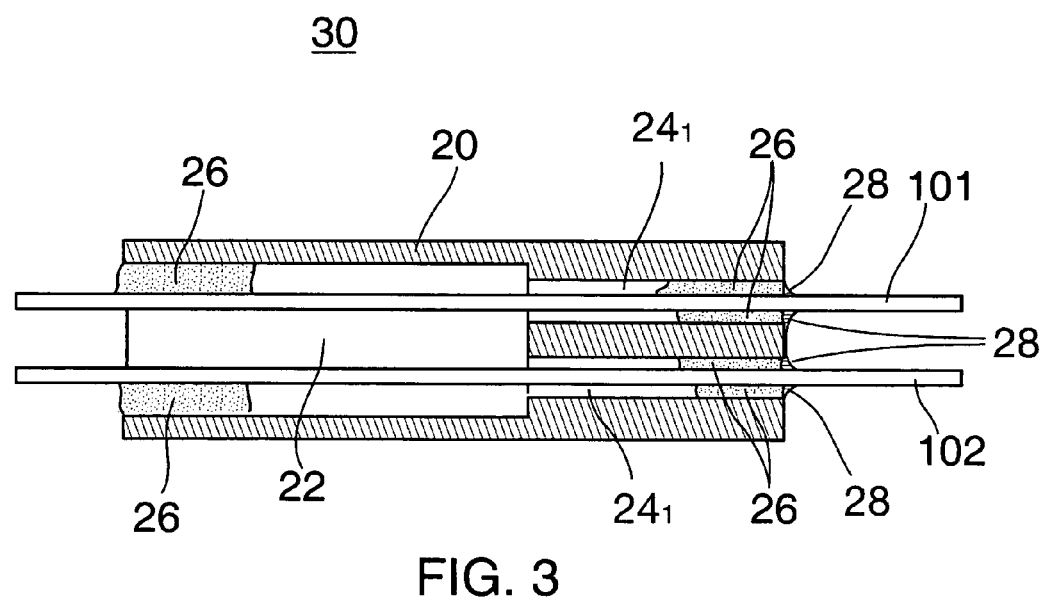
FIG. 3 is a cross-sectional, side view of two optical fibers assembled within the ferrule depicted in FIG. 2.

FIG. 3 is a cross-sectional, side view of two optical fibers $10_1$ and $10_2$ assembled with the ferrule 20. Both optical fibers $10_1$ and $10_2$ pass through the large aperture 22. Optical fiber $10_1$ also passes through small aperture $24_1$ and optical fiber $10_2$ also passes through small aperture $24_2$. In order to retain the optical fibers $10_1$ and $10_2$ in the ferrule 20, a suitable epoxy or other adhesive material 26 is placed in the gaps between the optical fibers and the apertures 22 and 24. In some cases substantially the entire large assembly 22 may be backfilled with the epoxy material. The assembly of the fiber optic cable 1 and the ferrule 8 results in an optical fiber-in-ferrule assembly 30.

To ensure that a hermetic seal is formed between the optical fibers $10_1$ and $10_2$ and the ferrule 20 a solder 28 may be applied to the ferrule 20 at the location where the optical fibers $10_1$ and $10_2$ exit the small apertures 24. The solder 28 should have a relatively low melting temperature to reduce the risk of damaging the optical fibers. As is well known to those of ordinary skill in the art, in preparation for the solder, the portion of the sheath where the solder is to be applied should first be removed and the exposed portions of the fibers should be coated with a metallic material such as gold. Appropriate solder materials include tin, a tin-lead eutectic, and tin-silver.

The epoxy or adhesive material 26 that is employed may be any of a variety of different materials. For example, UV curable adhesive can be used. Because the epoxy bonds to the optical fiber the pull strength of the hermetic optical fiber seals is increased relative to the use of solder alone. The epoxy also reduces stress in the hermetic seal during mechanical deformation.

The invention claimed is:

1. A hermetically sealed, optical fiber assembly, comprising:
    a plurality of optical fibers;
    a ferrule having a first aperture extending through a first end of the ferrule and a plurality of second apertures extending through a second end of ferrule opposing the first end of the ferrule such that a continuous passage is formed between the first aperture and each of the second apertures, said first aperture having a diameter greater than a diameter of the second apertures and being sufficiently large in size to receive the plurality of optical fibers therein, each of said optical fibers traversing the first aperture and a respective one of the second apertures;
    an adhesive material securing each of the optical fibers to the first aperture and to said respective one of the second apertures; and
    a solder material bonding each of said optical fibers to an entrance to said respective one of the second apertures.

2. The optical fiber assembly of claim 1 wherein said adhesive material substantially fills said first aperture.

3. A method of forming a hermetically sealed, optical fiber assembly, said method comprising the steps of:
    providing a ferrule having a first aperture extending through a first
    end of the ferrule and a plurality of second apertures extending through a
    second end of ferrule opposing the first end of the ferrule such that a continuous passage is formed between the first aperture and each of the second apertures, said first aperture having a diameter greater than a diameter of the second apertures;
    inserting a plurality of optical fibers into the ferrule such that the plurality of optical fibers traverses said first aperture and each of the optical fibers traverse a respective one of the second apertures;
    applying an adhesive material between each of the optical fibers and the first aperture;
    applying an adhesive material between each of the optical fibers and said respective one of the second apertures; and
    applying a solder material to bond each of the optical fibers to an entrance to said respective one of the second apertures.

4. The method of claim 3 further comprising the step of substantially filling said first aperture with the adhesive material.

5. The method of claim 3 wherein the step of applying a solder material includes the step of removing a portion of a sheath surrounding each of the optical fibers and applying a metallic coating to each exposed portion of the optical fibers.

* * * * *